Dec. 15, 1959 D. P. GECK 2,916,883
CLAMPING DEVICE
Filed April 30, 1956
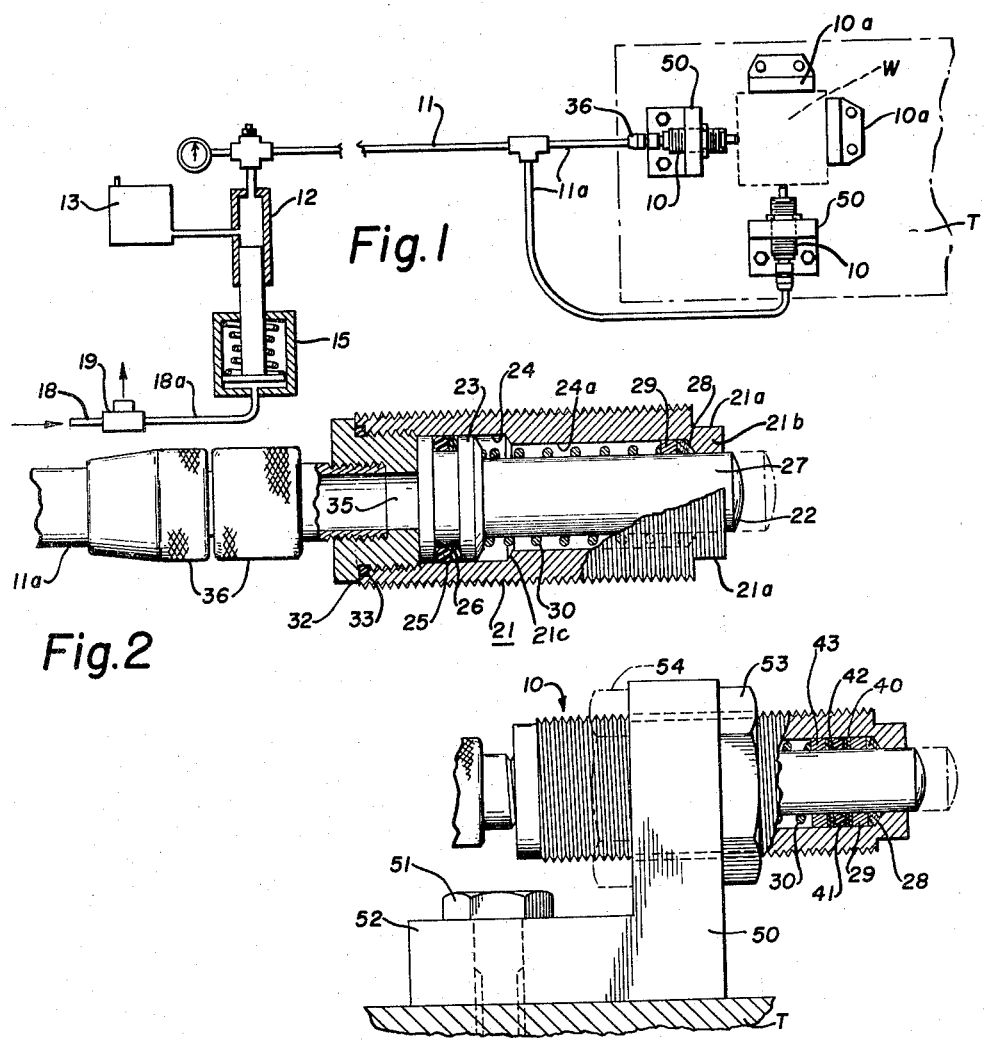
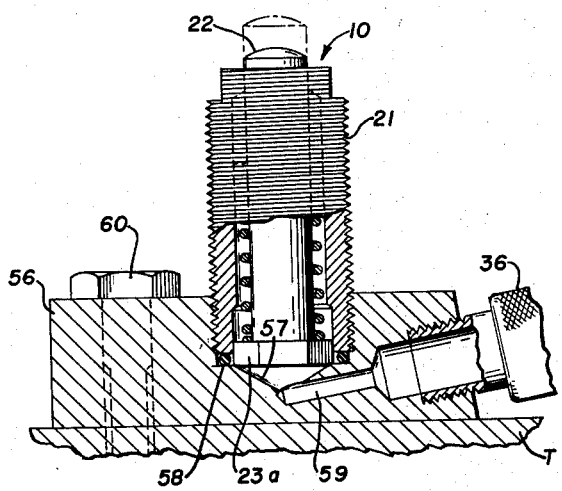
INVENTOR.
DONALD P. GECK
BY Golrick & Golrick
Atty's.

United States Patent Office 2,916,883
Patented Dec. 15, 1959

2,916,883

CLAMPING DEVICE

Donald P. Geck, Cleveland, Ohio

Application April 30, 1956, Serial No. 581,655

2 Claims. (Cl. 60—54.6)

The present invention relates generally to a fluid operated clamping system intended for quick clamp and quick release action; and more particularly to improvements in a work clamping system adapted for use in conjunction with various power tools.

For use with milling machines, surface grinders, drill presses and many other machine tools, particularly for production operations it is desirable to have quick acting and quick release clamping means whereby successive individual work pieces may be firmly secured in proper position on the work bed or table of the machine; and further that the clamping means used be easily installed and adjusted in set-up operations for particular shapes or sizes of work pieces to facilitate change-over from one production run to another. Various types of mechanically, pneumatically and hydraulically actuated clamps have been used for such purposes but have involved one or another disadvantage in slow action, physical structure or size, attained clamping force, or awkwardness of installation and adjustment. By the present invention there is provided a clamping system whereby a fluid, e.g. air, at relatively low pressure may be used as the initial source of clamping power or force, with an intervening simple force multiplying air-operated hydraulic cylinder unit or pump supplying hydraulic liquid high pressure to novel compact, rugged and relatively low cost hydraulic jacks as clamping units for applying clamping force to the work. The nature of these jacks is such that relatively a small volume of pressure fluid is required for operation of each unit, that the jack units are readily installed and adjusted on a machine work table or in jigs and fixtures in set-up operations, and further have broad utility for adjustable installations in close quarters or where space is at a premium.

A general object of the invention is then the provision of an improved work clamping system for machine tools of the character described. A further object is the provision of a novel clamping jack of compact size, and of simple, rugged and low cost construction. A still further object is the provision of a simple clamping jack capable of operation under relatively high hydraulic pressures with minimum or no leakage. Other objects and advantages will appear from the following drawings wherein:

Fig. 1 is a schematic diagram of a clamping system incorporating features of this invention;

Fig. 2 is a detail view partly in section of a hydraulic clamping jack according to this invention;

Fig. 3 is a side view of one of the jacks of this invention involving a modification of the means for slidably sealing the piston to the cylinder and also showing one manner of mounting the same in use; and Fig. 4 is a side view showing a still further way of mounting a jack of this invention, and also showing a further structural detail of a plunger or piston member which may be used in conjunction with the seal modification of Fig. 3.

In Fig. 1 a pair of clamping jacks 10—10 are shown each in opposed relation to a corresponding fixed block 10a for applying clamping force to a work piece W therebetween, the jacks and blocks being secured to the work table T of a machine. The jacks are connected through hydraulic lines 11—11a with a reciprocating type hydraulic pump 12 drawing liquid from the reservoir 13. For powering the pump 12 air cylinder 15 with its spring returned piston connected to the piston of pump 12 is supplied with air under pressure from line 18 through a control valve 19, the piston in 15 preferably having a large diameter relative to that in hydraulic unit 12 for deriving a high hydraulic pressure from a relatively low air pressure in a supply line 18. The valve 19 may be a two-way valve putting the air cylinder inlet line 18a selectively in communication either with line 18 for application of clamping force or with a valve exhaust port venting the air cylinder to the atmosphere for release of the clamping force.

In Fig. 2 one of the clamping jacks 10 is shown in partial section as comprised of a generally bolt-like cylindrical hollow body 21 externally threaded over its entire length, with a pair of parallel wrench flats 21a formed on one end; and disposed in the hollow body for limited reciprocation, a plunger member 22 having an integral circumferentially grooved, enlarged portion 23 as a piston head sealed to the large internal cylinder bore 24 through an O-ring 25 placed side by side in the piston head groove with a flexible back-up ring 26 of Teflon. A reduced cylindrical portion 27 of the plunger extends forwardly through and is slidably supported in and guided by the apertured end wall 21b of the body. Ring 28, of felt or other like material, surrounding the extension 27 and supported by the sloping or conical shoulder terminating the smaller inner bore 24a at the inner side of the end wall 21b with its metal follower ring 29 form plunger extension packing and wiper structure.

A helical compression spring 30 disposed about the plunger extension bears endwise upon the piston head and through the follower and felt rings upon the end wall as a plunger return, its end thrust in conjunction with the end wall taper serving to compress the felt ring about the plunger. The shoulder 21c formed between the bores 24, 24a of the body provides an end stop for outward extension or clamping motion of the plunger. A threaded plug 32 as a closure in the threaded outer end of the cylinder bore 24 is sealed to the body by small O-ring 33 retained in an annular groove between the threaded part of the plug and the plug head, the very end of the bore preferably having a shallow counterbore to be threadfree circumferentially of the O-ring locus, and a central bore 35 in the plug is threaded to receive an end fitting or connector whereby an hydraulic line may be connected to the jack for supplying hydraulic fluid to the cylinder working space thereof. The head of plug 32, as shown in Figs. 1–2 for example, in its maximum transverse or diametric dimension is smaller than the thread root diameter of the body, permitting threaded engagement of the jack from either end with a female thread in stud-like fashion.

Preferably a quick-disconnect coupling 36 of the self-sealing type is provided as the fitting threaded into 35, whereby flexible hydraulic hose used as lines 11a may be easily connected to or disconnected from the jacks for changing clamp set-up without admitting air into the jacks or to the lines with which used. Since such couplings are well known to the prior art the coupling 36 is not represented and described in detail.

In Fig. 3 there is shown not only a useful mounting of a jack unit, but also a modification from the form of Fig. 2 whereby the enlargement 23 of the plunger 22 need not be sealed to the body, but may act only as a plunger guide in its bearing on bore 24 and as a stop in coming into contact with shoulder 21c. Hence the piston head groove and sealing rings 25, 26 are omitted and the corresponding plunger enlargement may be a hex head shape (as shown in Fig. 4) with diagonal dimension corresponding to the diameter of bore enlargement 24 or other shape, whereby guiding support is given the the inner plunger end while ready flow of liquid past the enlargement is permitted to avoid obstruction of its movement by trapped liquid.

However to seal the plunger to the body, between the metal follower ring 29 of felt ring 28 and spring 30 there are interposed successively a "Teflon" back-up ring or washer 40, an O-ring 41, a second "Teflon" back-up ring 42 and a second metal follower ring 43. When hydraulic pressure is not applied to the unit, the thrust of the spring keeps the O-ring in sealing contact with the plunger extension 27 and bore 24a at all times; and under high hydraulic pressures the Teflon rings apply added thrust to seal the O-ring more effectively and themselves in bearing more firmly on the body and plunger prevent the O-ring from extruding under pressure.

Fig. 3 discloses one manner of mounting and using the jacks. Here a block 50 is secured to the work supporting machine table surface T by bolts 51 or other fasteners extending through lateral base flanges 52. Although here shown merely as a bolt extending through the flanges 52 and threaded into the underlying support surface, any suitable means may be used to that end. A transverse bore through the block is threaded to receive the threaded body of jack 10 and the latter locked by a nut 53, the threaded engagement with the block permitting easy adjustment of the axial position of the jack body to bring the plunger extension range into proper location relative to the work. The block bore may be unthreaded, with a second nut 54 used to hold the jack in position as shown by the dashed outline in Fig. 3.

In Fig. 4 another mounting method is shown, where a flat base block 56 has an upwardly open threaded socket 57 to receive the end of the threaded end of the jack body 21 with a sealing O-ring 58 between the end face of the body and a shoulder of the socket. A passage 59 counterbored and threaded at its outer end for a fitting such as 36 supplies pressure fluid to the jack, the end plug 32 and threaded portion of the counterbore being omitted since not necessary in this setup. The block is simply secured on any reaction surface as by bolts 60.

In both the jack forms shown, the compactness, simplicity, ready adjustability and low fluid volume requirement are clearly apparent, and the use of the tough resilient and durable Teflon rings in both forms is very effective in producing an excellent seal and prevention of O-ring extrusion even under high pressures. Further the very compactness of the units permits of a short plunger stroke in many situations where a bulkier unit would necessitate a longer stroke for convenient access to a clamping area by a tool element or in transferring work in and out of such area. However the general structure here shown is of great utility with a longer unit or longer work stroke, since its diametral dimension is comparatively small and the features of adjustable strong mounting, excellent durable pressure sealing and other advantageous characteristics are still present. With an aptly selected return spring, quick release and return action is readily achieved, since no great circumferential sealing and thus plunger retarding force continually applied to the plunger, as at a tight packing gland structure, is required to handle high pressure fluid.

I claim:

1. In a fluid pressure work clamping system, a clamping jack comprising: a generally cylindrical unheaded bolt-like body having a longitudinal bore therein as a hydraulic cylinder element providing a fluid working space, a plunger element reciprocable as a pitson in said bore and extendable from one end of the body, the outwardly extendable end of said plunger element being adapted for endwise bearing engagement with work to be clamped, said plunger element and said bore having respective cooperating shoulder formations limiting the extension of said plunger, means slidably sealing the elements to each other, closure means for the other end of said bore providing a passageway into said space and adapted to be connected to a fluid supply line for admission of pressure fluid to said cylinder for extending said plunger, plunger-returning helical compression spring means disposed about said plunger within said body and between the shoulder formation of said plunger and said one end of the body, said body having a straight external thread over substantially its entire length and wrench engageable formations within the cylindrical diametrical extent of the body whereby the jack may be axially adjustably mounted and secured in threaded engagement with a female threaded mounting element.

2. A clamping unit as described in claim 1, wherein said sealing means is a series of annular elements about said plunger and interposed between said spring and said body, the series comprising a first metal washer and axially spaced therefrom a second metal follower washer for receiving endwise thrust of the spring, and between the follower washers a pair of "Teflon" back-up rings with an O-ring interposed therebetween, said rings being in circumferential contact with the bore and plunger extension.

References Cited in the file of this patent

UNITED STATES PATENTS

| | | |
|---|---|---|
| 797,187 | Ensign | Aug. 15, 1905 |
| 1,635,696 | Upham | July 12, 1927 |
| 1,656,880 | Mason | Jan. 17, 1928 |
| 1,801,749 | McEachern | Apr. 21, 1931 |
| 2,202,125 | Temple | May 28, 1940 |
| 2,258,466 | Naylor | Oct. 7, 1941 |
| 2,349,170 | Jackman | May 16, 1944 |
| 2,383,241 | Down | Aug. 21, 1945 |
| 2,427,787 | Hunter | Sept. 23, 1947 |
| 2,429,390 | Case | Oct. 21, 1947 |
| 2,567,641 | Hazelton | Sept. 11, 1951 |
| 2,603,952 | Dodge | July 22, 1952 |
| 2,613,648 | Johnson | Oct. 14, 1952 |